Jan. 12, 1943. P. W. THORNHILL 2,308,404
SHOCK ABSORBER
Filed Dec. 30, 1940 2 Sheets-Sheet 1

INVENTOR
P. W. Thornhill
By: Stevens and Davis
ATT'YS.

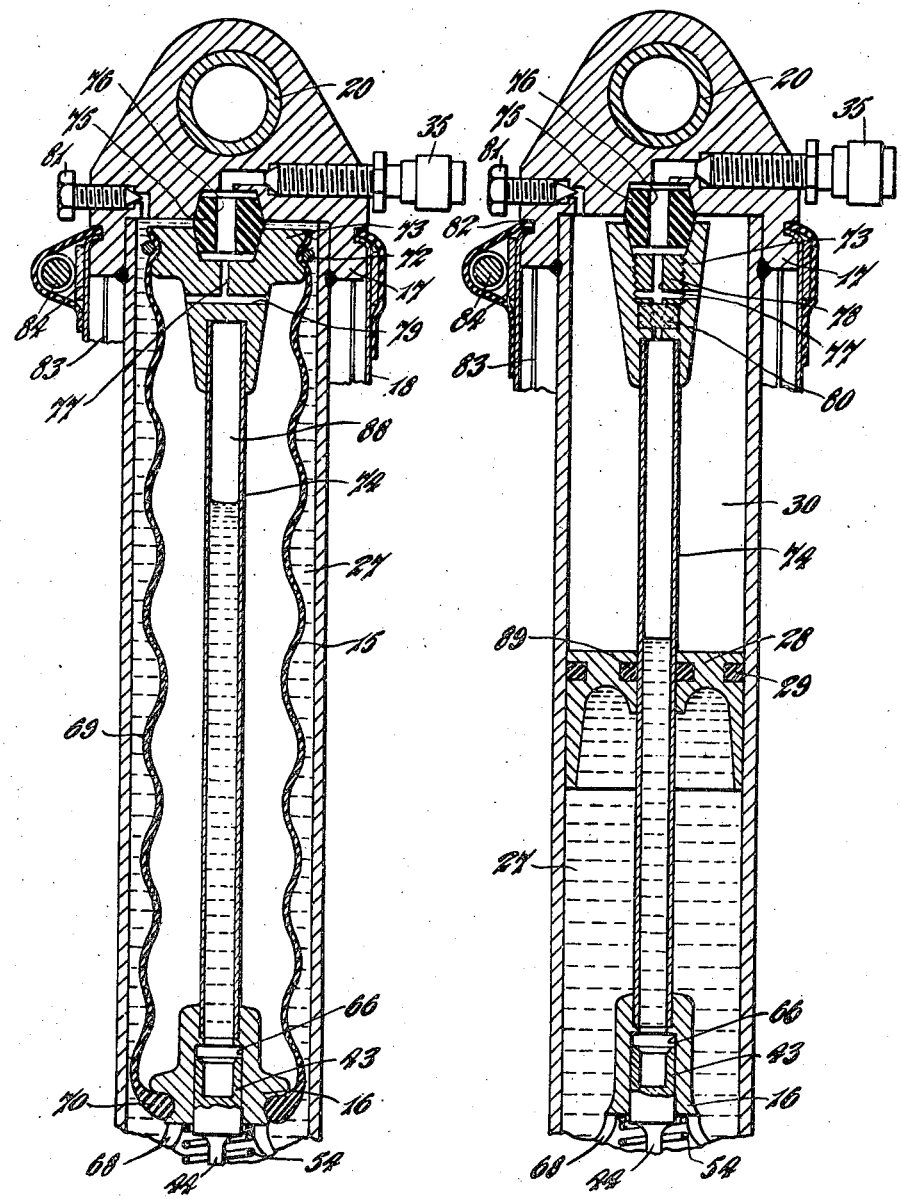

Patented Jan. 12, 1943

2,308,404

UNITED STATES PATENT OFFICE 2,308,404

SHOCK ABSORBER

Peter Warborn Thornhill, London, England, assignor of one-half to Automotive Products Company Limited, London, England Application December 30, 1940, Serial No. 372,417
In Great Britain June 24, 1940

9 Claims. (Cl. 267—64)

This invention relates to shock absorbers of the type in which liquid is used for damping relative movement of a pair of members, usually a cylinder and a plunger telescopically mounted therein, resilient means such as a quantity of compressed gas and/or one or more springs being provided to sustain the load which is normally carried by the shock absorber due to the weight of the vehicle or equivalent upon which the shock absorber is installed.

It is the object of the present invention to provide improvements in such shock absorbers whereby they may be rendered more efficient, the invention being especially applicable to the form of shock absorber described in Patent No. 2,243,782.

In a shock absorber having a variable volume working space which is filled with liquid and which communicates by way of a damping valve device with a chamber arranged so that liquid entering it causes energy to be stored in resilient means, thereby placing the liquid under sufficient pressure to support the normal static load on the shock absorber, the present invention is characterised by the fact that a container for pressure fluid communicates with the said working space by way of a very constricted passage, whereby the container becomes charged with pressure fluid which, during the operation of the shock absorber, has a substantially steady value corresponding to the static load carried at the time, the said pressure fluid being caused to act upon the damping valve device and control the action of the latter.

Further, there is provided according to the invention a shock absorber having a variable volume working space which is filled with liquid and which communicates by way of a damping valve device with a chamber arranged so that liquid entering it causes energy to be stored in resilient means, thereby placing the liquid under sufficient pressure to support the normal static load on the shock absorber, characterised by the fact that the damping valve device comprises a pair of non-return valves arranged in opposition and having controlling means adapted to open one or the other of said valves, the controlling means being urged in one direction by the pressure in the variable volume working space, and in the opposite direction by the pressure of a quantity of fluid which is disposed in a container and is connected with the pressure fluid in the shock absorber only by means permitting a very gradual transference of fluid into and out of the container, whereby the pressure within the latter is at all times substantially equal to the pressure which corresponds with the static load on the shock absorber at the time.

Preferably the controlling means comprises a piston valve member having a cylindrical portion sliding in a bore, a stem which extends along a passageway connecting the variable volume working space with the chamber, and which is formed with a radial flange located between a pair of annular valve members slidable in said pasageway, and an inwardly projecting abutment for the annular valve members provided within said passageway at a position between said valve members, the cylindrical portion having that end surface nearer the stem acted upon by the pressure of the liquid in the shock absorber, while said cylindrical portion is urged resiliently in the opposite direction by a force produced by the fluid disposed within the container. The controlling means can conveniently be disposed in the piston head of the plunger while the container may comprise a tube extending longitudinally within the plunger.

In a shock absorber in which the resilient means for extending the shock absorber comprises a quantity of compressed gas disposed within the plunger, the container may be in permanent communication with this compressed gas by way of a member permitting the gas to pass into and out of the container at only a very slow rate, said member conveniently being in the form of a plug or other device composed of porous material. In an alternative arrangement the cylindrical portion of the piston valve member is disposed at the bottom of the container and has sufficient working clearance in its bore to enable liquid to be forced into the container by the pressure within the shock absorber, thus compressing the gas in the container to a pressure substantially equal to that present in the shock absorber when the latter is in equilibrium bearing a static load. The container may be completely isolated from the compressed gas in the plunger or it may be connected at its upper part with the compressed gas in the plunger, and at its lower part with the damping liquid, in each case by way of means which allows the fluid concerned to pass at only a very slow rate.

The invention is described by way of example in the accompanying drawings, in which:

Figures 5 and 6 are fragmentary sectional elevations to show modifications in the arrangement of the plunger for a shock absorber of the form shown in Figure 1.

Figure 1:
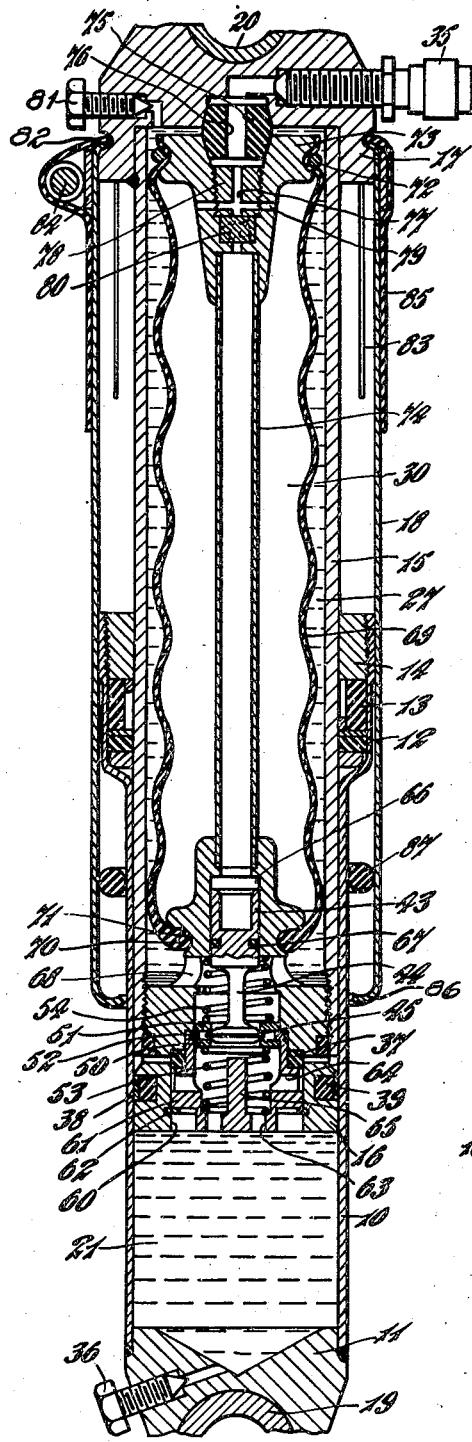
Figure 1 is a sectional elevation of one form of shock absorber.

The shock absorbers shown in the drawings are intended primarily for use on motor cars, tanks, and other land vehicles, but of course the principles involved can be applied equally well to shock absorbers or struts for use in the undercarriage, tail wheels and nose wheels of aircraft. In each case the shock absorber or strut is arranged so that shortening of a pair of telescopic members, as would normally be caused by applying the usual load to the shock absorber, causes energy to be stored in a resilient medium, which latter, after a predetermined amount of movement has occurred, is capable of supporting the whole load on the shock absorber. In other words, the shock absorber comprises springing means as well as means for damping relative movement of the shock absorber elements.

In each of the arrangements shown in the drawings one of these elements comprises a tubular cylinder 10, which is closed at its lower end by a plug 11 and is enlarged in diameter at 12 to accommodate a packing assembly, which is indicated generally at 13, this being held in position by a nut 14. The other element takes the form of a tubular plunger 15, which is slidable in a liquid-tight manner through the packing 13 and has its inner end closed by a piston head 16, the opposite end of said plunger tube 15 being closed by a cap 17 serving to carry a tubular shield 18 for protecting from dust, dirt and other foreign matter the outer sliding surface of said plunger tube 15. The plug 11 and cap 17 are shaped to form fixing lugs, which are shown partly broken away in Figures 1 and 4, and which are provided with tubular bearing bushes 19 and 20 respectively to engage with transverse pins (not shown) carried by the two parts of the vehicle or equivalent requiring to move relatively, for example the axial mounting and the chassis in the case of a motor vehicle.

The shock absorber shown in Figure 1 incorporates a valve device which is disposed within the piston head 16 of the plunger 15, and is somewhat similar in arrangement and operation to that described in Patent No. 2,243,782. The piston head 16 is formed with an axial recess 60 within which a plug member 61 is fixed by a split ring 62. The plug member 61 is formed with two series of apertures 63 in its end surface and 64 around its middle, said plug member having also an axial spigot 65. The latter is adapted to act as a stop for a flange portion 45 of a piston valve member having a stem 44 connected with a cylindrical portion 43. This cylindrical portion slides within a bore 66 formed in the piston head 16, a packing ring 67 being provided to prevent leakage of pressure liquid past the cylindrical portion 43. The plug member 61 is arranged to hold in position the abutment ring 52, while two annular valve members 50 and 51 are urged towards one another by coiled compression springs 53 and 54 respectively. Surrounding the plug member 61 is a rubber ring 37, which is adapted to act as a non-return valve, the liquid which passes said ring being free to flow through the openings 64 back into the working space 21 of the cylinder 10. Just below the bore 66 the piston head 16 is formed with a series of apertures 68, which lead into the liquid working space 27 within the plunger 15. In this construction of shock absorber the working space 27 is divided from the space 30 for compressed air by a tubular rubber bag or sac 69, which, at its lower end, is formed with a thickened beading 70 adapted to grip firmly a groove 71 just above the apertures 68. A rigid metal tube 74 extends upwardly from the piston head 16 and carries at its extremity a closure member 73, which latter is grooved around its periphery and acts as a fastening for the upper end of the rubber bag 69, a clamping ring 72, serving to produce a fluid-tight connection. The closure member 73 and the end cap 17 of the plunger are recessed to accommodate a nipple 75, which is conveniently composed of slightly resilient rubber in order to provide a passageway 76 which connects an air inlet valve 35 with the interior of the closure member 73 without allowing liquid from the space 27 to enter said passageway 76. This passageway leads into a working space 30 for compressed air by way of an axial passage 77 drilled through a retaining plug 78 and a plurality of radial passages 79 formed in said retaining plug and in the closure member 73. The retaining plug 78 serves to hold in position within the closure member 73 a plug 80 composed of porous material, such as unglazed porecelin, which is capable of passing air under pressure at an extremely slow rate, said plug thus constituting a very limited means of communication between the working space 30 and the interior of the tube 74.

The cross sectional area of the cylindrical portion 43 is equal to the area of the aperture in each of the annular valve members 50 and 51, so that the piston valve member 43—45 is in a state of balance as far as the pressure liquid within the space 27 is concerned and is urged in one direction or the other by the liquid in a working space 21 within the cylinder 10 or the compressed air in the tube 74, depending upon which of these pressures is the larger.

When the shock absorber is in operation and is in a state of equilibrium, the pressures in the various parts are substantially equal, and are of course dependent upon the axial load which the shock absorber is bearing. This of course applies also to the pressure of the air within the tube 74, as the limited communication with the compressed air in the space 30 provided by the porous plug 80 is sufficient to enable the pressures to become equalised in course of time. This means that the pressure existing within the tube 74 is dependent upon the load of the shock absorber but is substantially unaffected by the rapid fluctuation in pressure which takes place when the shock absorber is extending and contracting on account of inequalities in the road surface. On the other hand, if the static load on the shock absorber should be modified, for example by passengers entering or leaving the vehicle, the pressure of the air within the tube 74 will correspondingly adjust itself within the course of a few minutes so as to suit the new conditions of loading. Thus the pressure of the air within the tube 74 compensates automatically for variations in the load.

In order that the operation of the shock absorber may be clearly understood, it will be supposed that said shock absorber is operatively interposed between the chassis of a vehicle and one of the wheels thereof so as to transmit to said wheel a predetermined gravitational load constituting part of the weight of the vehicle. This load on the shock absorber will be called W and the corresponding intensity of fluid pressure in the shock absorber necessary to support the load W will be regarded as being P.

When the vehicle is travelling along a smooth surface the shock absorber is under normal static conditions, the load, as mentioned above, being W and the internal fluid pressure being P. When the wheel in question strikes and rides over a bump, the chassis of the vehicle tends to follow its original level course, with the result that the cylinder 10 of the shock absorber rises relative to the plunger 15, thus raising the pressure of the liquid in the cylinder space 21.

Figure 2:
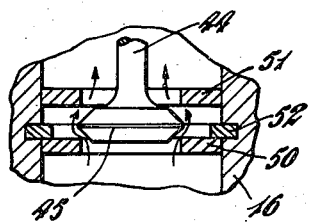
Figures 2, 3 and 4 are fragmentary sectional views of the valve device in various working positions.
Figure 3:
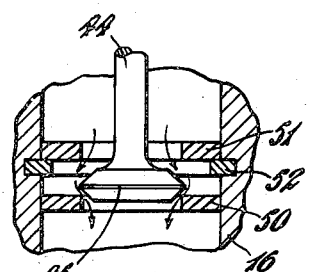
Figure 4:
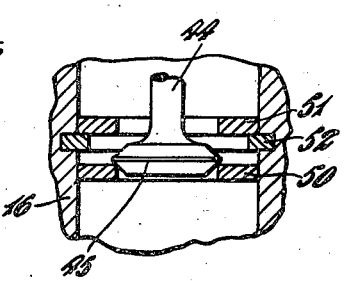

The liquid is able to escape freely from the working space 21, as the increased pressure in said space 21, by acting upon the flange 45, is able to overcome the pressure of the air within the tube 74 acting in opposition upon the cylindrical portion 43, thus moving the flange 45 upwardly away from the annular valve member 50 and enabling the pressure liquid from the working space 21 to lift the annular valve member 51, as shown in Figure 2. It then escapes to the working space 27, where it causes the bag 69 to be contracted, thus increasing the compression of the air within the working space 30. By the end of the contracting stroke the pressure within the whole of the shock absorber will have risen to a value somewhat above P, but the pressure within the working space 21 rapidly diminishes to P at the commencement of the recoil stroke owing to the fact that the annular valve member 51 re-engages with the flange 45 of the piston valve member. As the extending movement of the shock absorber proceeds the pressure in the working space 21 drops to a value below P, and then the air pressure within the tube 74 is able to force down the piston valve member so that the flange 45 occupies the position shown in Figure 3, where it has separated from the annular valve member 51, thus permitting liquid within the working space 27 to force down the annular valve member 50 and pass into the cylinder space 21 until the pressure therein once again resumes the static value P. Similarly when the wheel falls into a depression in the road surface the pressure liquid from the working space 27 is able to enter the working space 21 quite freely during the extension of the shock absorber, as the flange 45 and the piston valve member 51 occupy the positions shown in Figure 3. This enables the liquid from the working space 27 to pass through the annular valve member 51 and force the annular valve member 50 away from the flange 45, as shown. The pressure within the working space 21 will naturally be less than P at the end of this extending stroke, but it rapidly reassumes the value P at the beginning of the recoil stroke, for the annular valve member 50 closes against the flange 45, as shown in Figure 4, thus preventing the escape of liquid from the working space 21. Very soon, of course, the pressure in this working space 21 rises above P, with the result that the piston valve member 43—45 is pushed upwards against the pressure of the air in the tube 74 and as soon as the flange 45 leaves the annular valve member 50, as shown in Figure 2, the liquid is able to escape at the requisite rate from the working space 21 by lifting the annular valve member 51.

The rubber bag or sac 69 is beaded at its lower end 70 with a view to preventing said bag or sac from being damaged in the event of the damping liquid leaking from the shock absorber. In these circumstances the compressed air within the bag or sac 69 would cause the latter to expand and it might even be forced through the apertures 68 were it not for the fact that the bead 70 can, when unduly stressed, slide past the apertures 68, thus allowing the compressed air to escape without doing harm.

In the construction shown in Figure 1 a plug 81 is provided for bleeding purposes. The tubular shield 18 has its upper edge turned inwardly at 82 for engagement with a peripheral groove formed in the cap 17, the upper part of said shield 18 being rendered resilient by a number of longitudinal sawcuts 83 and being tightened in place by a clamping ring device 84, said sawcuts 83 being covered by a short length of rubber tubing 85 to exclude dirt and other foreign matter. The lower edge of the shield 18 is turned inwards at 86 and a rubber ring 87 of circular cross section is adapted to engage between the outside of the cylinder 10 and the inside of the shield 18 so as to "roll" against these parts and form a seal during the lengthening and shortening of the shock absorber.

The two modifications shown in Figures 5 and 6 are applicable to the construction of shock absorber shown in Figure 1 and are concerned principally with the means employed to obtain within the tube 74 air at a pressure corresponding to that which is present in the shock absorber as a whole when said shock absorber is in a loaded but static condition.

In Figure 5 the cylindrical portion 43 is a lapped fit within the bore 66, and this provides an extremely small leakage space which, in the course of time, permits liquid from the working space 27 to find its way into the tube 74. The latter is closed completely at its upper end and when the shock absorber is assembled said tube 74 is filled with air. When the shock absorber is charged with liquid and then pumped up to the requisite working pressure the liquid, in finding its way past the cylindrical portion 43, enters the tube 74 from the bottom, thus compressing the air within the top part of the tube 74 as indicated at 88, the pressure, of course, eventually becoming equal to that which is present in the shock absorber when the latter is in its normally loaded static condition. The operation of the shock absorber is therefore the same as the form illustrated in Figure 1, the pressure of the air within the space 88 serving to force down the piston valve member 43—45 when the pressure within the working space 21 of the cylinder becomes less than that which is necessary to support the load on the shock absorber.

In the construction shown in Figure 6 the upper part of the tube 74 is arranged in a manner similar to Figure 1, a plug 80 of porous material being adapted to allow the slow passage of air to and from the working space 30 containing the compressed air. The latter is bounded by a floating piston 28 which, in this instance, is of simple construction and is provided with packing rings 29 and 89. The cylindrical portion 43 is of identical construction to that shown in Figure 5 and is adapted to allow the very slow leakage of liquid into the bottom end of the tube 74. As a consequence the fluid pressure within said tube 74 is maintained by two independent sources, namely by way of the plug 80 and the cylindrical portion 43, so that the likelihood of faulty operation occurring is considerably reduced.

It will be appreciated that the constructions described are given merely as examples of the invention and that various modifications are possible. For instance, where a rubber bag or sac is used to separate the compressed air or other gas from the damping liquid the air may be accommodated between said rubber bag or sac and the plunger tube, the interior of said bag or sac being connected with the working space 21 of the cylinder by way of the damping valve device. Further, the constructional details of the damping valve itself may be modified. The improved shock absorbers may be adapted to operate with either end uppermost, and of course any convenient means may be used for charging the shock absorber with damping liquid and compressed air or other gas.

What I claim is:

1. A shock absorber having a variable volume working space which is filled with liquid and which communicates by way of a damping valve device with a chamber arranged so that liquid entering it causes energy to be stored in resilient means, thereby placing the liquid under sufficient pressure to support the normal static load on the shock absorber, characterised by the fact that a container for pressure fluid communicates with the said working space by way of a very constricted passage, whereby the container becomes charged with pressure fluid which, during the operation of the shock absorber, has a substantially steady value corresponding to the static load carried at the time, the said pressure fluid being caused to act upon the damping valve device and control the action of the latter.

2. A shock absorber having a variable volume working space which is filled with liquid and which communicates by way of a damping valve device with a chamber arranged so that liquid entering it causes energy to be stored in resilient means, thereby placing the liquid under sufficient pressure to support the normal static load on the shock absorber, characterized by the fact that the damping valve device comprises a pair of non-return valves arranged in opposition and having controlling means adapted to open one or the other of said valves, the controlling means being urged in one direction by the pressure in the variable volume working space, and in the opposite direction by the pressure of a quantity of fluid which is disposed in a container and is connected with the pressure fluid in the shock absorber only by means permitting a very gradual transference of fluid into and out of the container, whereby the pressure within the latter is at all times substantially equal to the pressure which corresponds with the static load on the shock absorber at the time.

3. A shock absorber as claimed in claim 1, wherein the controlling means comprises a piston valve member having a cylindrical portion sliding in a bore, a stem which extends along a passageway connecting the variable volume working space with the chamber, and which is formed with a radial flange located between a pair of annular valve members slidable in said passageway, and an inwardly projecting abutment for the annular valve members provided within said passageway at a position between said valve members, the cylindrical portion having that end surface nearer the stem acted upon by the pressure of the liquid in the shock absorber, while said cylindrical portion is urged resiliently in the opposite direction by a force produced by the fluid disposed within the container.

4. A shock absorber as claimed in claim 2, wherein the controlling means is disposed in the piston head of the plunger.

5. A shock absorber as claimed in claim 2, wherein the container comprises a tube extending longitudinally within the plunger.

6. A shock absorber as claimed in claim 2, in which resilient means for extending the shock absorber comprises a quantity of compressed gas disposed within the plunger, wherein the container is in permanent communication with this compressed gas by way of a member permitting the gas to pass into and out of the container at only a very slow rate.

7. A shock absorber as claimed in claim 2, in which resilient means for extending the shock absorber comprises a quantity of compressed gas disposed within the plunger, wherein the container is connected with the compressed gas in the plunger by way of a plug or other member composed of porous material.

8. A shock absorber as claimed in claim 1, wherein the controlling means comprises a piston valve member having a cylindrical portion sliding in a bore, a stem which extends along a passageway connecting the variable volume working space with the chamber, and which is formed with a radial flange located between a pair of annular valve members slidable in said passageway, and an inwardly projecting abutment for the annular valve members provided within said passageway at a position between said valve members, the cylindrical portion having that end surface nearer the stem acted upon by the pressure of the liquid in the shock absorber, while said cylindrical portion is urged resiliently in the opposite direction by a force produced by the fluid disposed within the container, and wherein the container holds a quantity of gas, the cylindrical portion of the piston valve member being disposed at the bottom of the container and having sufficient working clearance in its bore to enable liquid to be forced into the container by the pressure within the shock absorber, thus compressing the gas in the container to a pressure substantially equal to that present in the shock absorber when the latter is in equilibrium bearing a static load.

9. A shock absorber subdivided into a variable volume working space and a chamber by a plunger, a damping valve in said plunger, said working space and said chamber communicating through said damping valve, pressure responsive means in said chamber for storing energy in resilient means, a container for pressure fluid extending into said chamber but sealed against communication therewith, said container communicating with said working space through a very restricted passage, whereby the container becomes charged with pressure fluid from the working space which during the operation of the shock absorber has a substantially steady value corresponding to the static load carried at the time, the said pressure fluid being caused to act upon the damping valve to control the action thereof.

PETER WARBORN THORNHILL.